(12) United States Patent
Kotowski et al.

(10) Patent No.: US 11,611,172 B2
(45) Date of Patent: Mar. 21, 2023

(54) BUSBAR DESIGN THAT TERMINATES WITH SEALED CONNECTOR

(71) Applicant: Littelfuse, Inc., Chicago, IL (US)

(72) Inventors: Dave G. Kotowski, Geneva, IL (US); Michael J. Skrzypczak, Lombard, IL (US)

(73) Assignee: Littelfuse, Inc., Chicago, IL (US)

( * ) Notice: Subject to any disclaimer, the term of this patent is extended or adjusted under 35 U.S.C. 154(b) by 34 days.

(21) Appl. No.: 17/210,998

(22) Filed: Mar. 24, 2021

(65) Prior Publication Data
US 2022/0311177 A1 Sep. 29, 2022

(51) Int. Cl.
*H01R 13/52* (2006.01)
*H01R 25/16* (2006.01)
*H01R 11/09* (2006.01)

(52) U.S. Cl.
CPC ....... *H01R 13/5221* (2013.01); *H01R 25/162* (2013.01); *H01R 11/09* (2013.01)

(58) Field of Classification Search
CPC .... H01R 9/226; H01R 13/5221; H01R 11/09; H05K 5/0026
See application file for complete search history.

(56) References Cited

U.S. PATENT DOCUMENTS

| 8,835,760 | B2* | 9/2014 | Saimoto | H01R 9/226 |
| | | | | 174/559 |
| 9,054,508 | B2* | 6/2015 | Yamamoto | H01R 13/113 |
| 9,774,155 | B2* | 9/2017 | Shimizu | H01R 13/41 |
| 2006/0040526 | A1 | 2/2006 | Shirota | |

FOREIGN PATENT DOCUMENTS

| EP | 1018783 A2 | 7/2000 |
| JP | H08-273736 A | 10/1996 |
| JP | H08335476 A | 12/1996 |
| JP | 2005269867 A | 9/2005 |
| JP | 5847131 B2 | 1/2016 |

OTHER PUBLICATIONS

Extended European Search Report dated Sep. 7, 2022 for corresponding European Patent Application No. 22161770.7.

* cited by examiner

*Primary Examiner* — Briggitte R. Hammond
(74) *Attorney, Agent, or Firm* — KDB Firm PLLC

(57) ABSTRACT

A novel busbar, suitable for low-power applications, features a u-shaped extension having a male terminal that fits into and establishes electrical connection with a standard female terminal. The housing of an electrical box including the busbar is modified to receive the female terminal in such a way that Ingress Protection ratings of IP67 and IP69K are maintained within the electrical box. The busbar is not riveted to a thicker busbar terminating with a stud and lug nut, as in legacy configurations, thus being simpler and cheaper to manufacture. The female terminal, once connected to the busbar, is removable by inserting a tool into a dedicated opening within the housing.

18 Claims, 12 Drawing Sheets

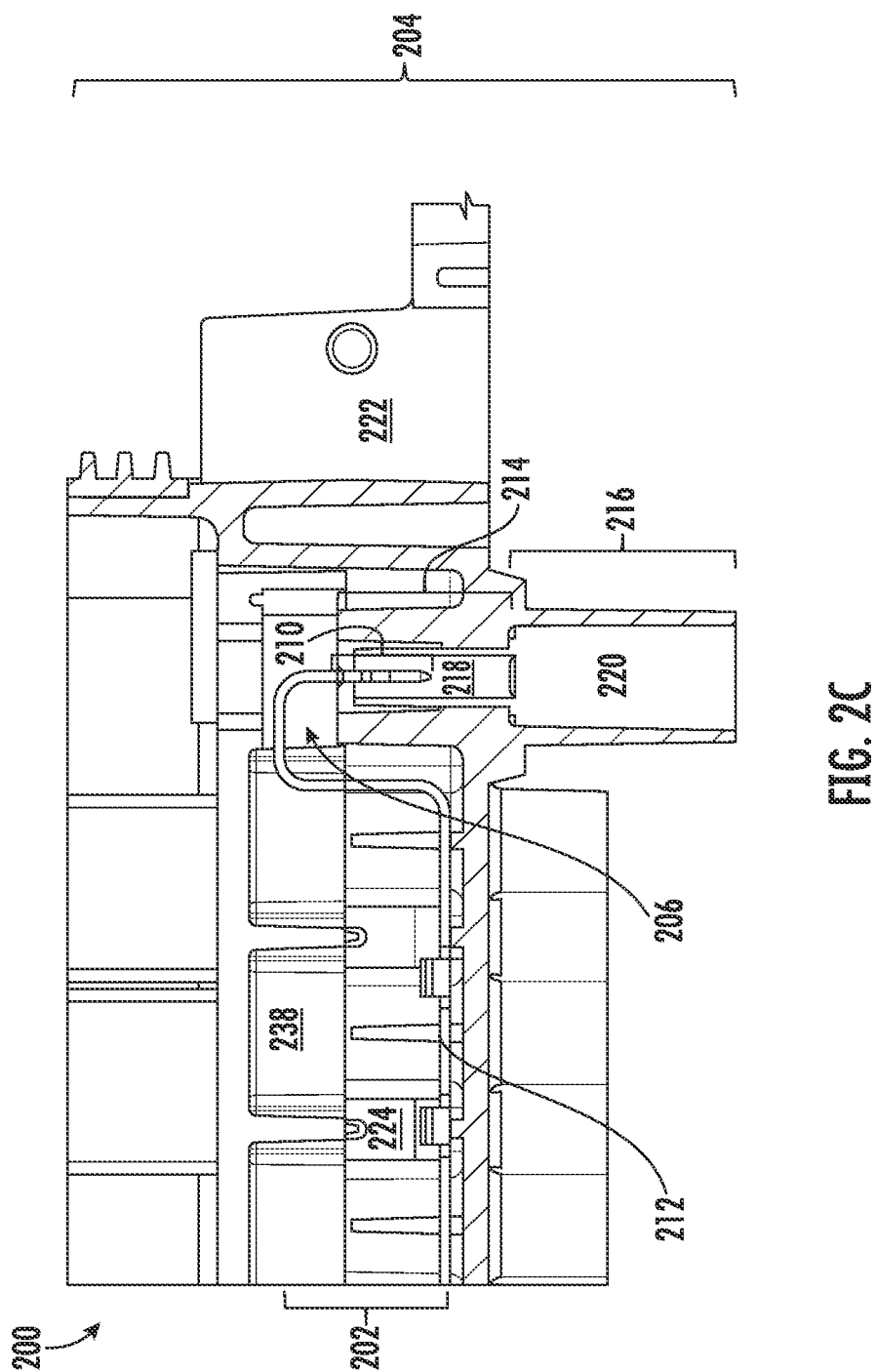

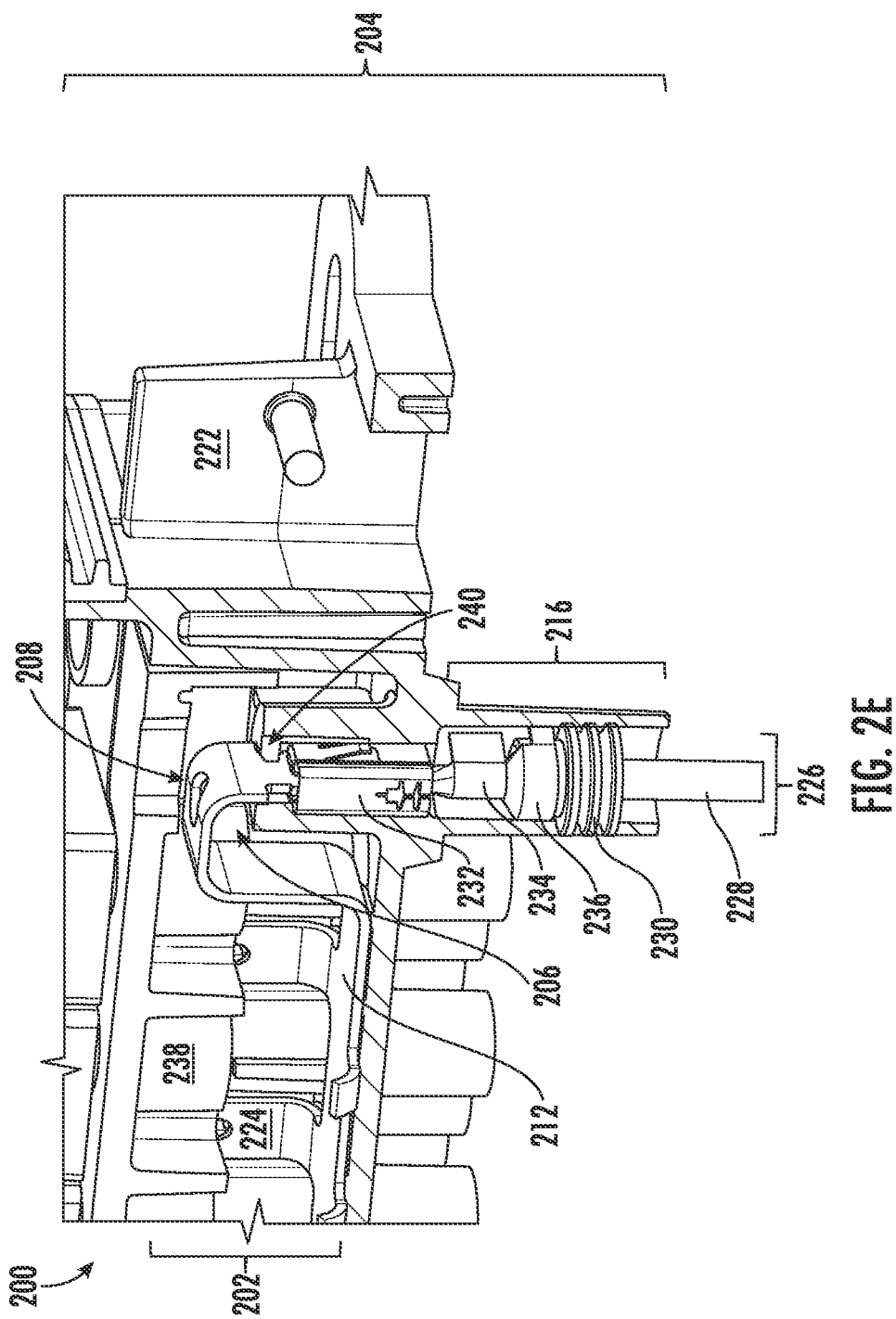

BUSBAR DESIGN THAT TERMINATES WITH SEALED CONNECTOR

FIELD OF THE DISCLOSURE

Embodiments of the present disclosure relate to busbars and, more particularly, to a busbar design for low power applications.

BACKGROUND

Vehicles are equipped with a variety of electrically powered equipment. These electrically powered devices may be controlled by a power distribution module (PDM). PDMs are installed in applications to ensure circuits are protected, controlled, and/or sensed. PDMs provide centralized, safe power distribution for many applications, and may include fuses, relays, circuit breakers, current sensing components, and Controller Area Network (CAN) and Local Interconnect Network (LIN) modules.

Recently, some manufacturers have developed smaller PDMs intended to bridge the gap between inline fuse holders and isolated relays/circuit breakers and the primary PDM. This distribution of PDM function into primary PDM and secondary PDMs enables the consolidation of components for accessory and overflow circuits in one location. Ease of installation, simplified troubleshooting, and maintenance are among the benefits of this distributed PDM network.

The environment within a vehicle presents a challenge for the distributed PDM network. In addition to connecting the primary PDM to a number of secondary PDMs to ensure electrical connectivity, the ingress of water and other contaminants must be strictly protected. Many manufacturers, for example, produce PDMs that have IP67 (total protection from dust and protected from temporary liquid immersion) and IP69K (proven to resist ingress of high temperature and pressure wash) Ingress Protection ratings. Because the components, such as fuses and relays, are accessed during maintenance, they cannot be permanently sealed within the hard-wired box of the PDM.

Further, because of the distribution of the PDM function into secondary PDMs, there may be some electronic systems within the vehicle that use less power than others. A PDM for a high-power application may feature a thick busbar connected to a heavy lug and nut. Using a secondary PDM designed for such high-power application may not be appropriate for functions of the vehicle which use a small amount of power. A one-size-fits-all approach to the PDM network may thus result in unnecessary costs and unused resources.

It is with respect to these and other considerations that the present improvements may be useful.

SUMMARY

This Summary is provided to introduce a selection of concepts in a simplified form that are further described below in the Detailed Description. This Summary is not intended to identify key or essential features of the claimed subject matter, nor is it intended as an aid in determining the scope of the claimed subject matter.

An exemplary embodiment of an electrical box in accordance with the present disclosure may include a housing and a busbar. The housing is for receiving multiple components and has a lower receptacle with an inner surface. The busbar is placed within the housing and supplies electrical power to the multiple components. The busbar has a base to be seated within the housing, multiple tines to be connected to the multiple components, and a u-shaped extension that has a male terminal at one end which is to be connected with a female terminal. The inner surface of the lower receptacle is shaped so that, once the female terminal is connected with the male terminal, a tight seal is formed between the inner surface and the female terminal.

Another exemplary embodiment of a busbar in accordance with the present disclosure may include a busbar base that is along a first axis, multiple tines that are along a second axis, and a u-shaped extension to the busbar base. The multiple tines are to connect to components in an electrical box. A male terminal at an end of the u-shaped extension is to be mated with a female terminal.

An exemplary embodiment of a housing for use in an electrical box in accordance with the present disclosure may include a busbar receptacle, an upper receptacle, and a lower receptacle. The busbar receptacle is for receiving a busbar, where the busbar provides power to components connected to the housing. The upper receptacle has an opening through which a male terminal of the busbar goes, and the upper receptacle receives a female socket interface of a female terminal. The lower receptacle has an inner surface designed so that, once the female terminal is connected to the male terminal, a rubber seal of the female terminal fits snugly against the inner surface.

BRIEF DESCRIPTION OF THE DRAWINGS

FIGS. 2A-2E are illustrations of a novel busbar design, in accordance with exemplary embodiments;

DETAILED DESCRIPTION

A novel busbar design, suitable for low-power applications, is disclosed herein. The busbar features a u-shaped extension having a male terminal that fits into and establishes electrical connection with a standard female terminal. The housing of an electrical box including the busbar is modified to receive the female terminal in such a way that Ingress Protection ratings of IP67 and IP69K are maintained within the electrical box. Further, the busbar, which includes tines for connecting the components of the electrical box to a power source, is not riveted to a thicker busbar and terminated with a stud and lug nut, as in legacy configurations, thus avoiding manufacturing steps as well as reducing costs. The female terminal, once connected to the busbar, is not removable externally, but is removable with a special tool inserted into a dedicated opening within the housing.

Figure 1A:
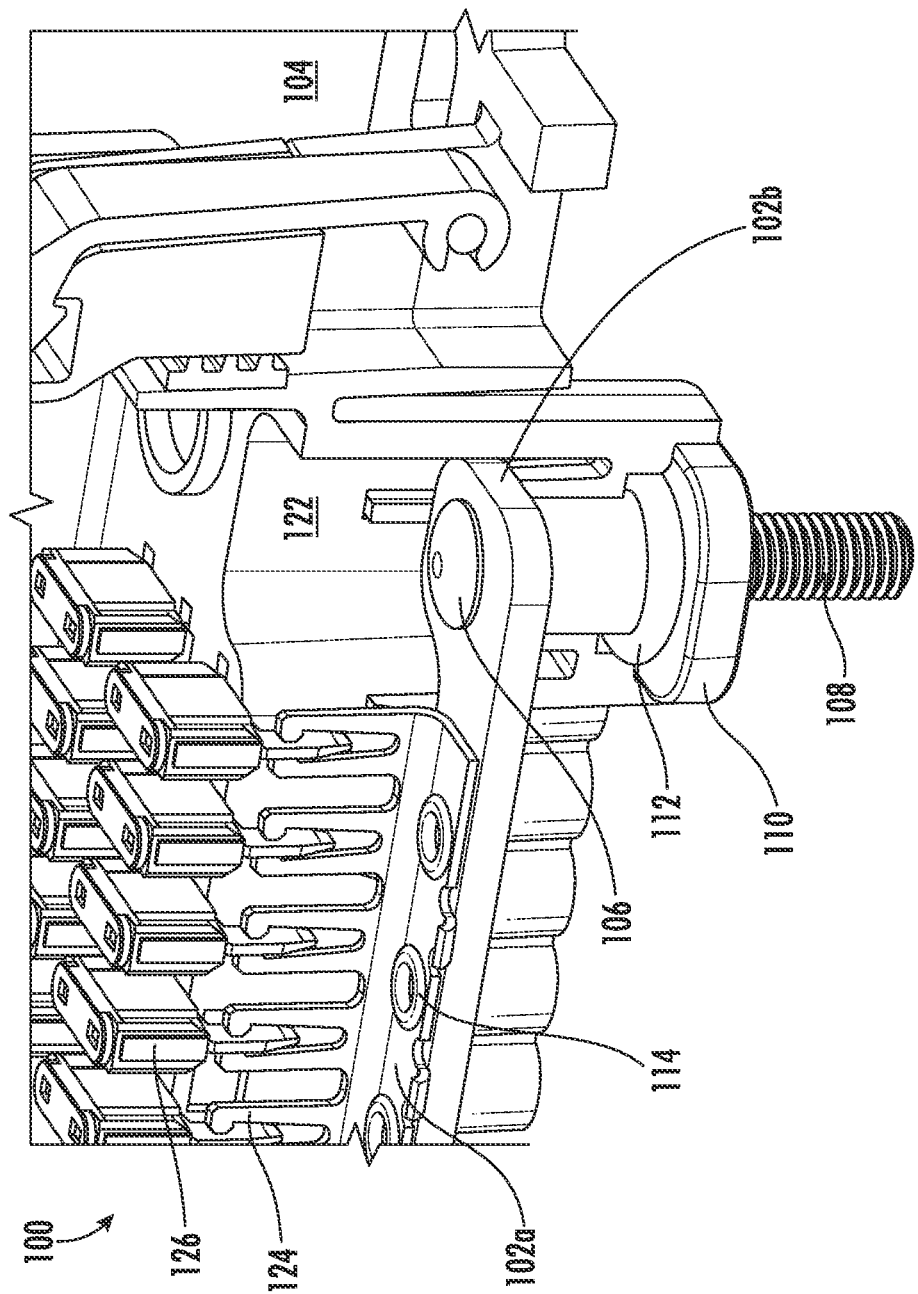
FIGS. 1A and 1B are illustrations of a busbar assembly, in accordance with the prior art.
Figure 1B:
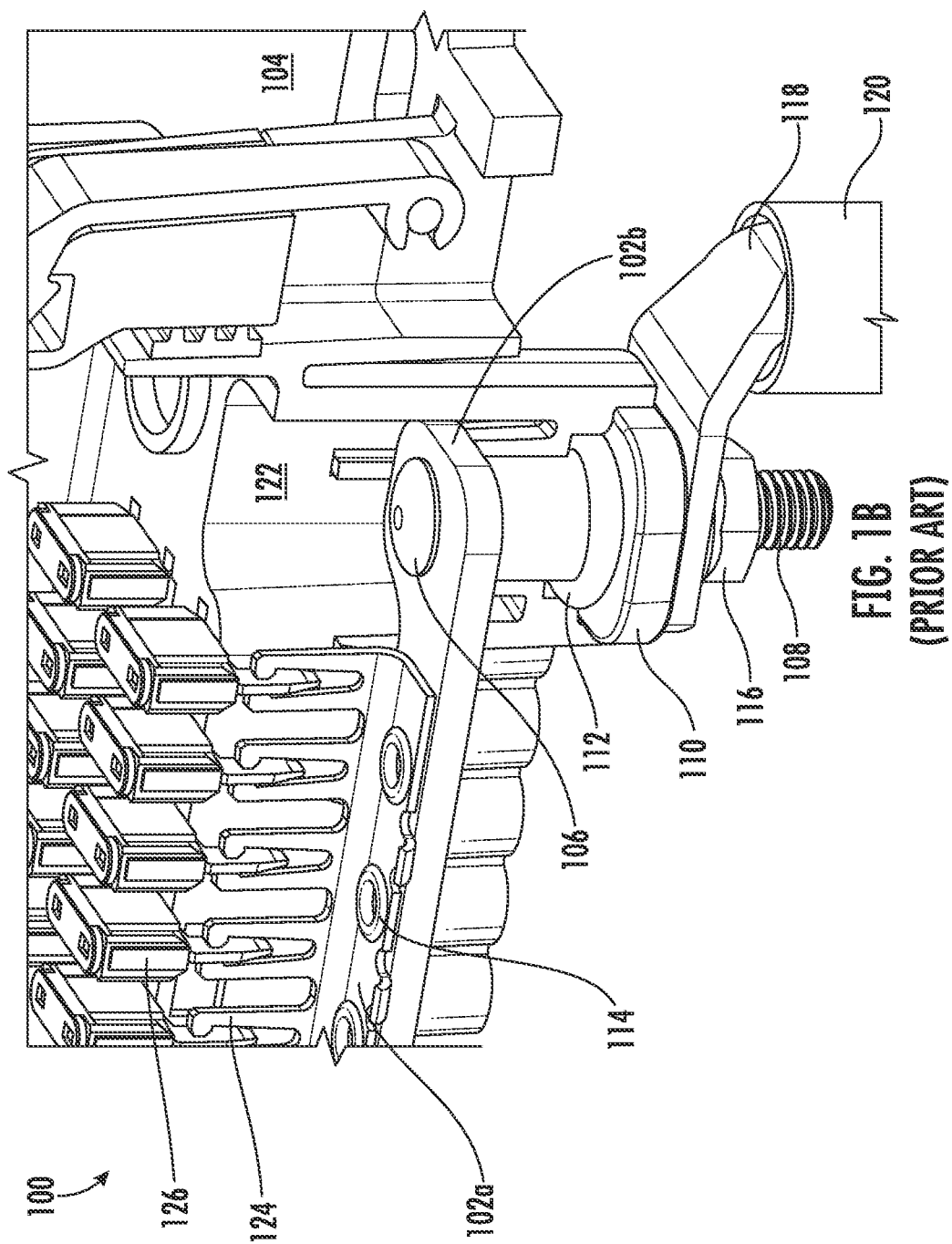

FIGS. 1A and 1B are representative perspective illustrations of a busbar assembly 100, according to exemplary embodiments. FIG. 1A shows the busbar assembly 100 unconnected to another device and FIG. 1B shows the busbar assembly connected to a lug and cable. The busbar assembly 100 features a first busbar portion 102a and a second busbar portion 102b (collectively, "busbar 102") that supplies power to components 126 contained within an electrical box 104. The electrical box may be a power distribution module (PDM) or, more precisely, a secondary PDM or mini-PDM that is part of a PDM network that supplies safe power distribution to an electrically powered system such as a vehicle. The components 126 of the electrical box 104 may thus include relays and fuses that protect particular electrical subsystems of the vehicle.

In addition to the busbar 102, the busbar assembly 100 features a stud 106 and lug nut 116 for securing a power lug 118 to the electrical box 104. In this example, the stud 106 includes a stud base 110 and a threaded portion 108. The stud base 110 is shaped to fit snugly within the housing 122 of the electrical box 104. An o-ring 112 is disposed on top of the stud base 110. The housing 122 appears to be shaped like one side of a rounded rectangle and the stud base 110 is also a rounded rectangular shape. The stud base 110 is so designed so that, along with the o-ring 112, once the power lug 118 is secured to the stud 106 with the lug nut 116, the electrical box 104 is protected against ingress of water, dust, or other materials that may contaminate the components 126 within the electrical box.

The power lug 118 features an aperture (not shown) for threading the power lug through the threaded portion 108 of the stud 106. Once in place, the power lug 118 is flush against a bottom surface of the stud base 110. The lug nut 116 is threaded through the threaded portion and tightly secured against the power lug 118. The power lug 118 is connected to a cable 120 that includes shrink tubing that electrically insulates the cable connection to the power lug.

The first busbar portion 102a includes tines 124 that connect, and ultimately provide an electrical pathway, between the components 126 of the electrical box 104 and a power source. Rivets 114 fixably connect the first busbar portion 102a to the second busbar portion 102b, ensuring a good electrical connection between them. Both the first busbar portion 102a and the second busbar portion 102b are made of an electrically conductive material, such as copper or copper alloy. As illustrated, the first busbar portion 102a is smaller and more intricate, featuring many tines 124 and many rivets 114, whereas the second busbar portion 102b is thicker and less intricate, though it does feature an aperture at its distal end (not shown) for receiving the stud 106.

The assembly of the first busbar portion 102a to the second busbar portion 102b is achieved by riveting operations on the rivets 14, of which there are many, until the two portions are fixably attached to one another, ensuring a good electrical connection between them. The resulting busbar 102 may be thought of as a heavy busbar, suitable for high-power applications, and the power lug 118 and nut 116 are also used for high-power applications. It may be that the electrical box 104 is used for a lower power application. Having such a heavy busbar, which involves some assembly, may not be suitable for a low power application.

Figure 2A:
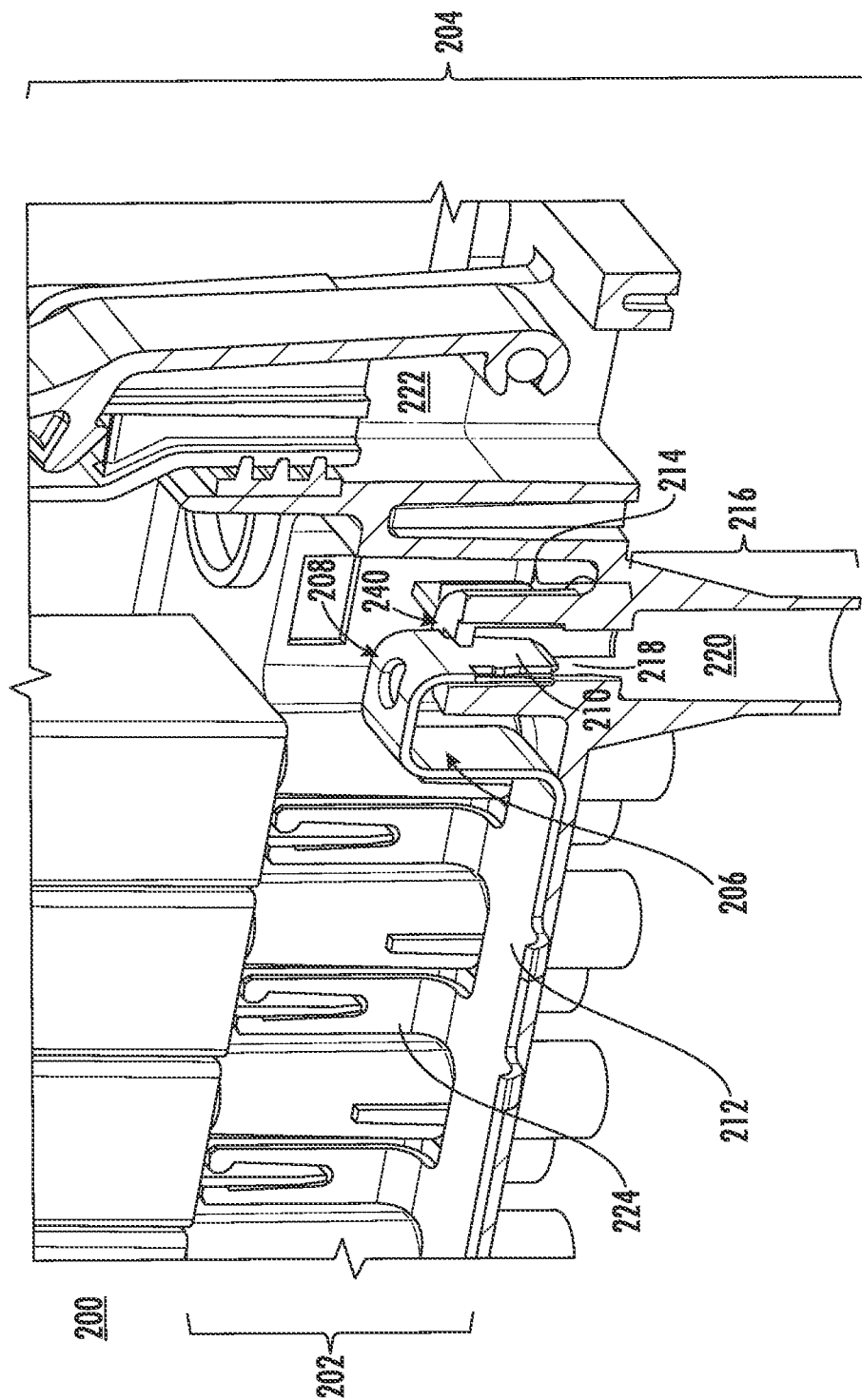
Figure 2B:
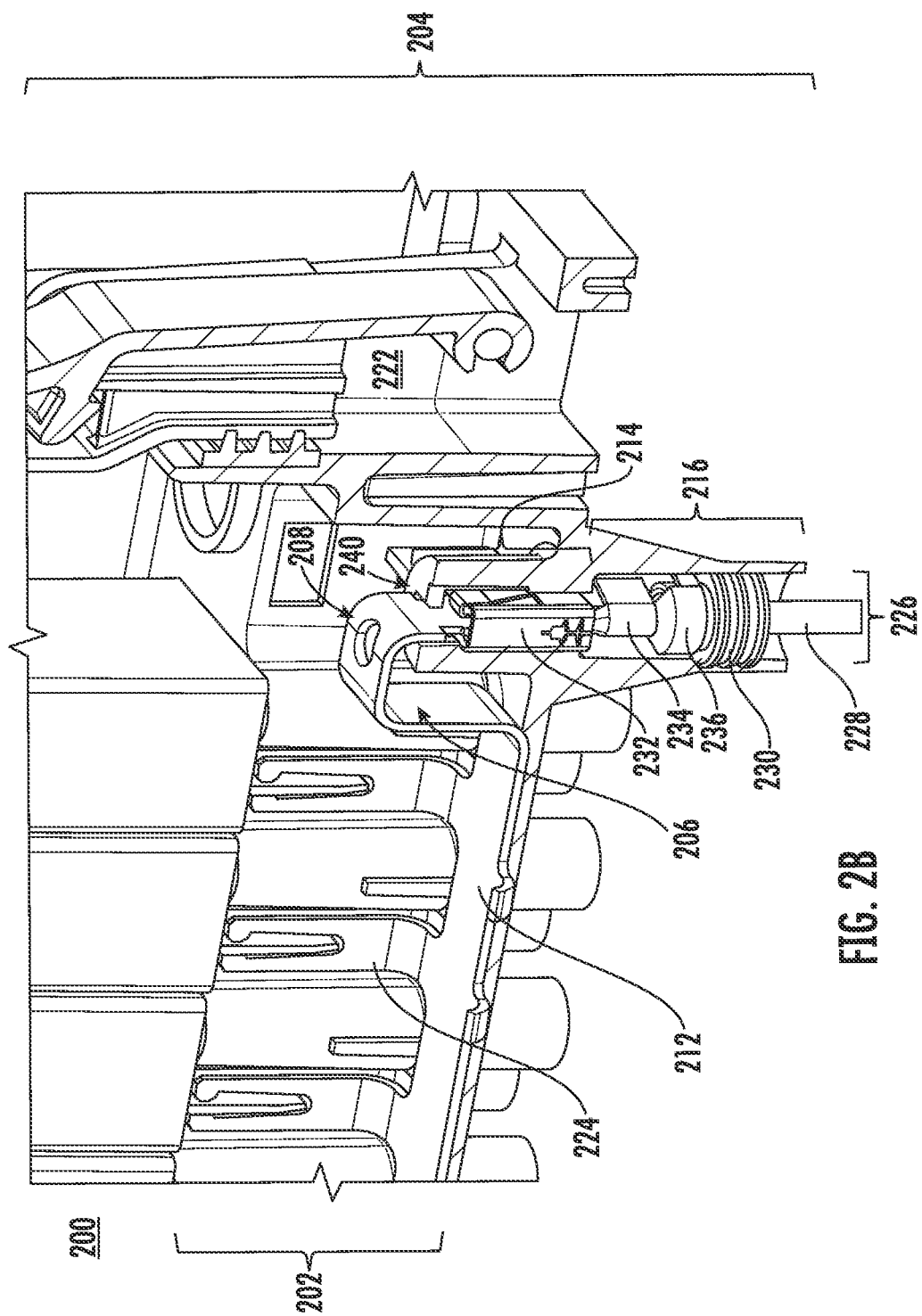
Figure 2D:
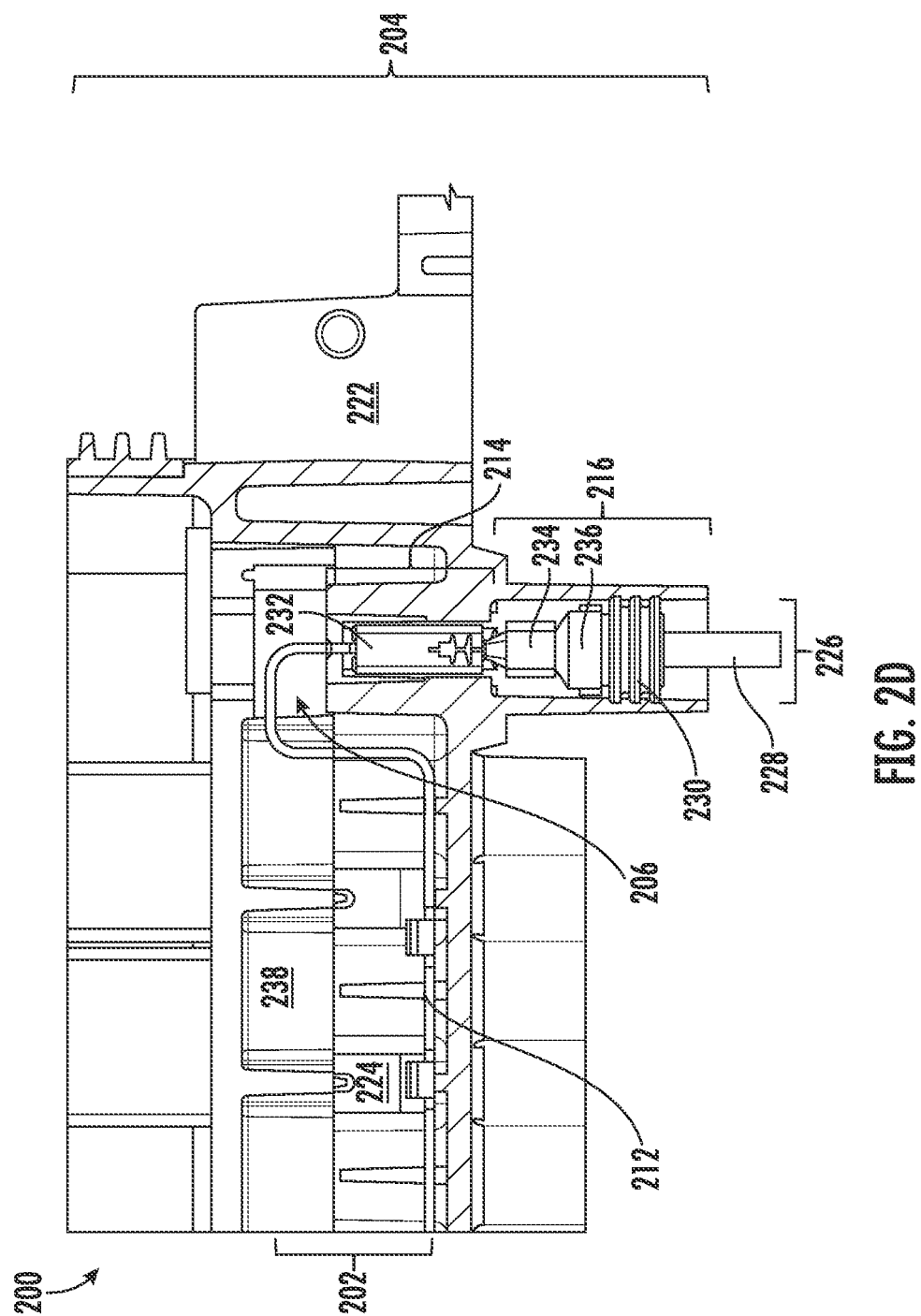

FIGS. 2A-2D are representative illustrations of a novel busbar assembly 200, in accordance with exemplary embodiments. FIGS. 2A, 2B, and 2E are perspective views while FIGS. 2C and 2D are side views. The busbar assembly 200 features a simplified busbar that is both less costly than the prior art busbar assembly 100 and is also more suitable for lower power applications.

The busbar assembly 200 features a busbar 202 that is part of an electrical box 204. The electrical box 204 may be part of a secondary PDM or mini-PDM, and may be located in industrial equipment, such as forklifts, trucks, and buses, or even in a consumer vehicle. The electrical box 204 distributes power and provides electrical protection for sensitive electrical devices within the vehicle. Though not illustrated, the electrical box 204 may house components such as mini-fuses, relays, current sensing devices, and so on. An electrical box 400 in FIGS. 4A-4D, below, presents another view of the components shown and described herein.

The components of the electrical box 204 do not draw high current, as may be the case with components in the prior art busbar assembly 100. Accordingly, in exemplary embodiments, the busbar 202 of the busbar assembly 200 is simpler and less expensive than that of the busbar assembly 100 (FIGS. 1A and 1B). The simplified busbar 202 includes a busbar base 212 featuring a u-shaped extension 206 at one end, an aperture 208, a male terminal 210, and tines 224, all of which are made from an electrically conductive material such as copper or copper alloy. The busbar 202 is shown in more detail, unconnected to the electrical box 204, in FIGS. 3A and 3B, below. The busbar base 212 and tines 224 are similar to the components of the busbar 102 (FIGS. 1A and 1B). The tines 224 are used to establish connection and, ultimately, provide an electrical path between components (not shown) of the electrical box 204 and a power source. Because the busbar 202 does not include the second portion (second busbar portion 102b), there is no need for the rivets 114 to hold the two busbar portions together. Thus, relative to the prior art busbar 102, the busbar 202 is simplified in terms of its assembly (no rivets and therefore no riveting operation) and in terms of cost (no costly second portion 102b, no stud 106, no o-ring 112, and no lug nut 116).

At one end of the busbar 202 is the u-shaped extension 206, in which the base 212 at its end is machined into the u-shape, with the end of the u-shape being the male terminal 210. The aperture 208, located at the top of the u-shaped extension 206, enables disconnection of a female terminal 226 from the male terminal 210. The female terminal 226 is a standard, off-the-shelf, part, available to consumers. The disconnect feature is discussed in more detail in conjunction with FIGS. 4A-4D, below. In an exemplary embodiment, the busbar 202, including busbar base 212, tines 224, u-shaped extension 206, aperture 208, and male terminal 210 are formed from a single piece of electrically conductive material.

Figure 4A:
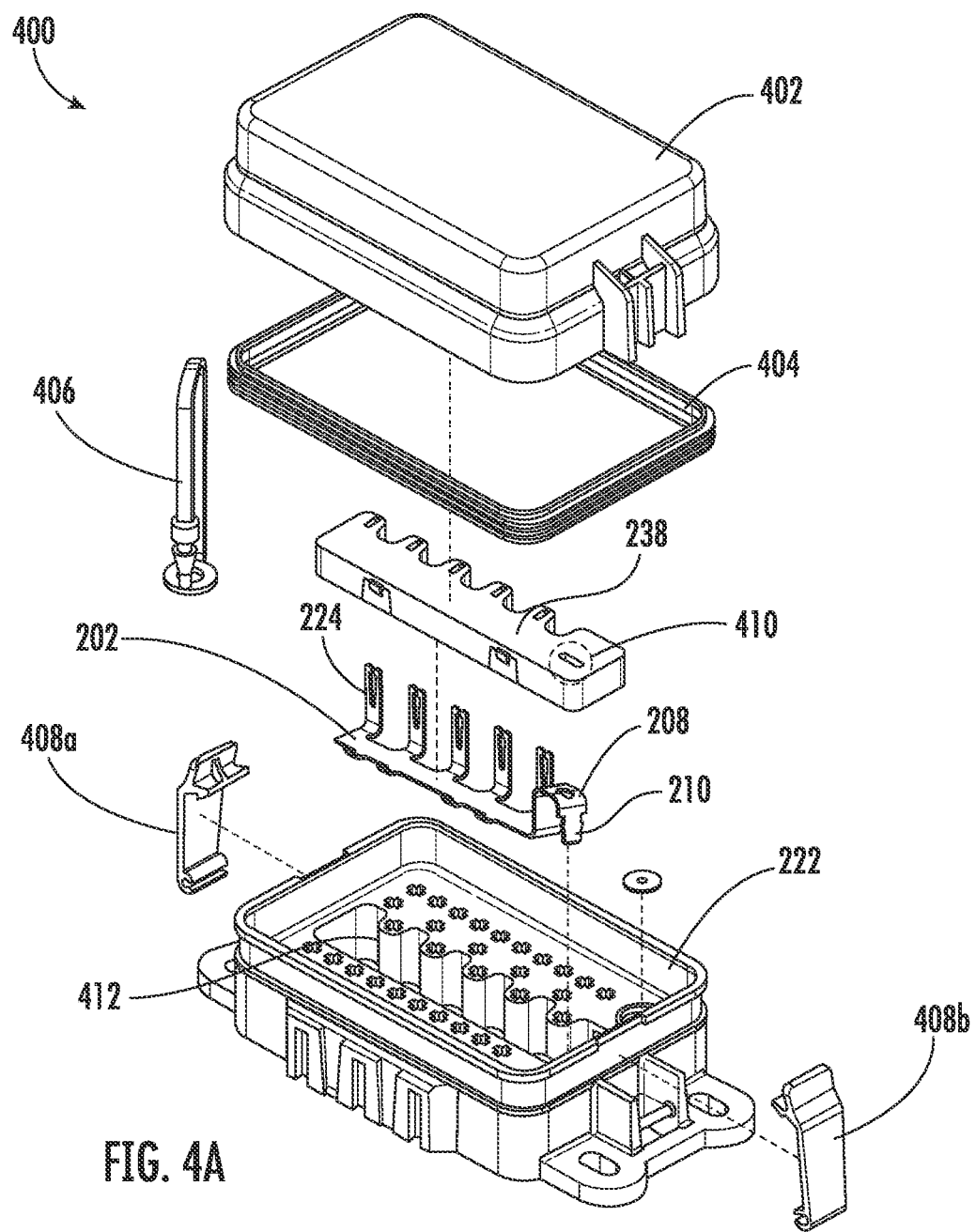
FIGS. 4A-4D are illustrations of the novel busbar design of FIGS. 2A-2F as part of an electrical box, in accordance with exemplary embodiments.
Figure 4B:
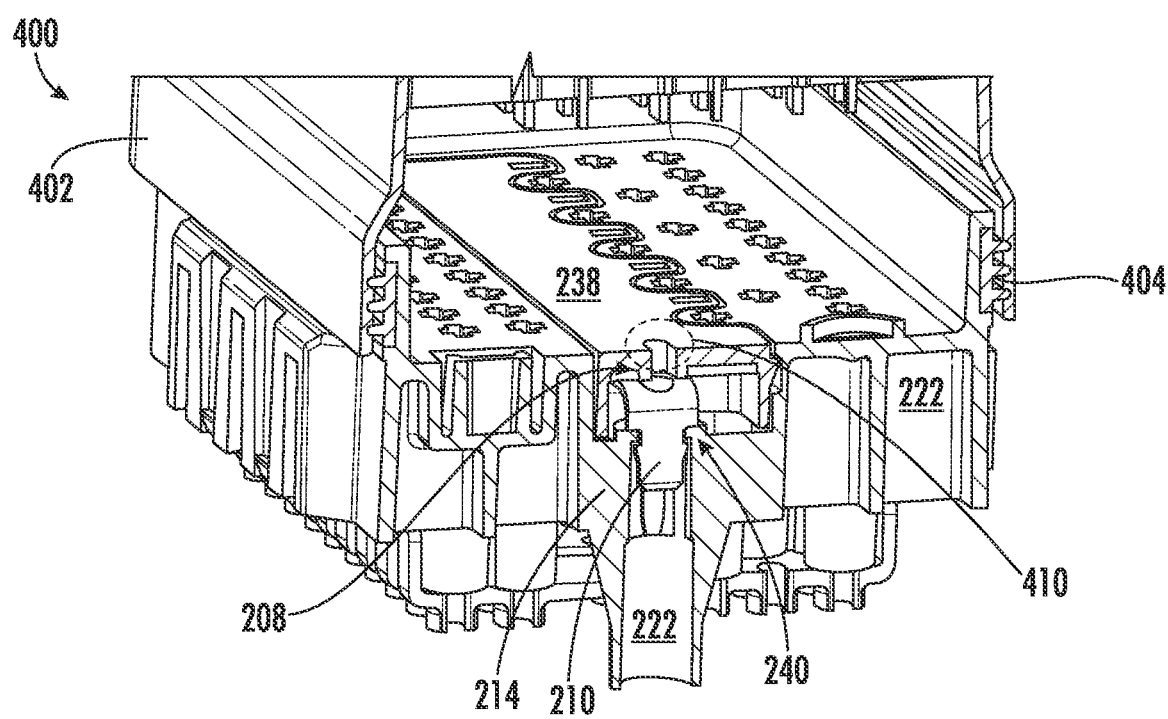
Figure 4C:
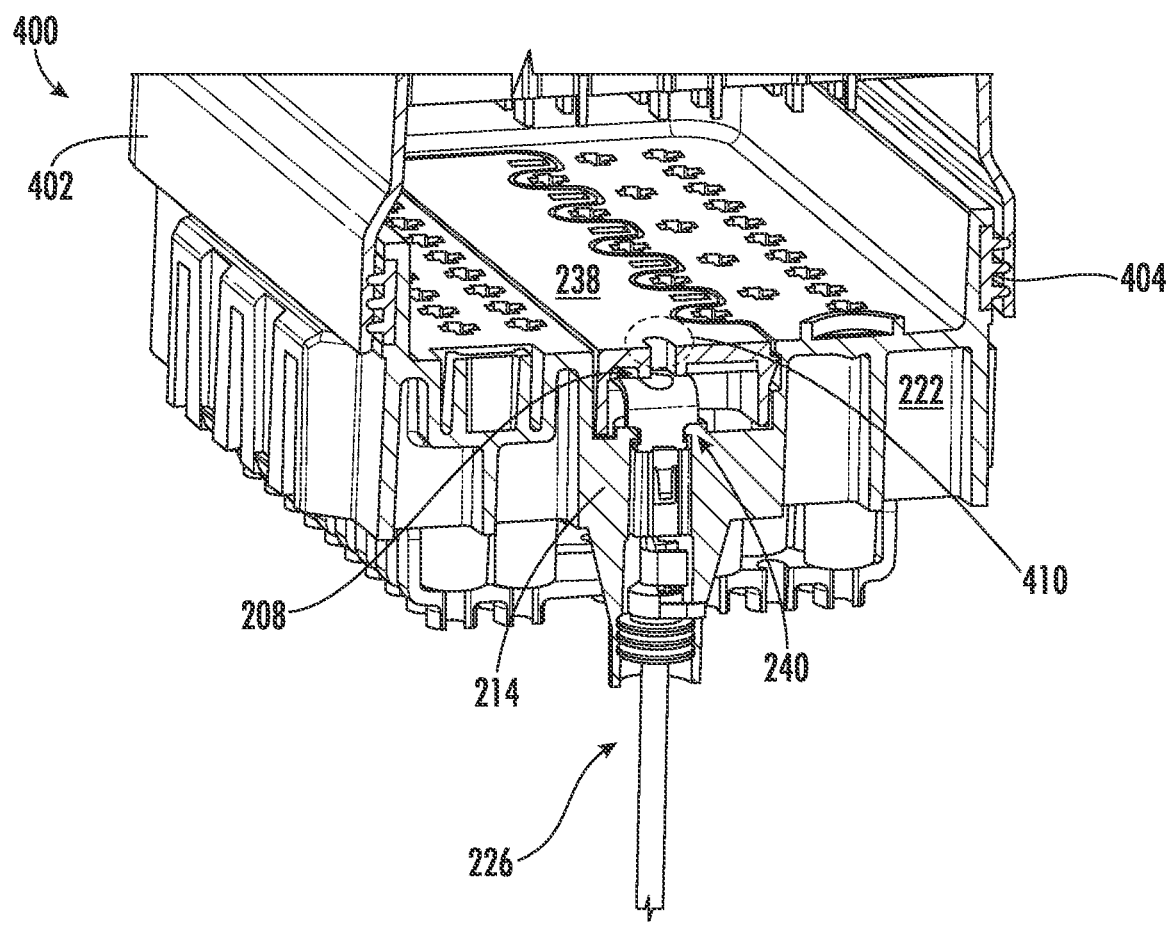

The busbar base 212 is disposed in along one plane while the tines 224 are disposed along a second plane, where, in exemplary embodiments, the second plane is perpendicular to the first plane. Further, in exemplary embodiments, the male terminal 210 is disposed along a third plane that is perpendicular to both the first and second planes. Where the busbar base 212 is disposed along an x-axis plane (e.g., horizontally), the tines 224 are disposed along a y-axis plane (e.g., vertically), and the male terminal 210 is disposed along a z-axis plane, as one example. The position of the electrical box 204 that contains the busbar 202, however, may vary within a vehicle. Electrical boxes may have mounting brackets that are straight, with the electrical box being mounted against the sheet metal of the vehicle body, or at a 30° angle, for example, for easier viewing and servicing. The electrical box may feature a busbar receptacle, as shown in FIGS. 4A-4C, below, for seating the busbar 202 such that the tines 224 are able to connect to components within the housing, and the male terminal 210 is able to receive the female terminal 226.

The electrical box 204 includes a component housing 222 for holding the busbar 202 and components to be added to the electrical box (not shown). The component housing 222 may be made from plastic or other material that may be injection-molded or otherwise formed as a unitary shape suitable for connecting with the other elements of the electrical box 204. At the location of the male terminal 210, the component housing 222 includes an upper receptacle 214 and a lower receptacle 216. The upper receptacle 214 includes an upper receptacle opening 240 through which the male terminal 210 of the busbar 202 is disposed. The upper receptacle includes an inner surface 218 while the lower receptacle 216 includes an inner surface 220. In exemplary embodiments, the upper receptacle 214 and the lower receptacle 216 and, more particularly, their respective inner surfaces 218 and 220, are designed to snugly fit the female terminal 226 such that the female terminal is able to mate with the male terminal 210 and thereafter establish a connection therebetween through which electrical current may travel.

Illustrated in FIGS. 2B and 2D, the female terminal 226 is a standard part available, for example, to a customer who purchases the electrical box 204. The female terminal 226 features a cable 228 and a rubber seal 230, along with a three-part connector consisting of a female socket interface 232, a wire crimp area 234, and a seal crimp area 236. The female socket interface 232 is the portion of the female terminal 226 that will mate with the male terminal 210 of the busbar 202. When engaged with the male terminal 210, the female socket interface 232 fits into the upper receptacle 214 of the component housing 222.

In an exemplary embodiment, the inner surface 218 of the upper receptacle 214 is designed so that the female socket interface 232 fits snugly into the space, allowing bi-directional movement along one axis, but does not allow either significant movement in an axis orthogonal to the one axis, or significant movement in a direction rotational to the axis. Thus, if the female terminal 226 is to be inserted into the upper receptacle 214 in a vertical direction (upward), the inner surface 218 is sized such that the female socket interface 232 is movable in an upward direction (to make connection with the male terminal 210) or in a downward direction (if not yet connected with the male terminal 210), but is not able to move in the horizontal direction (left and right within the upper receptacle 214) or in a rotational direction (twisting circularly within the upper receptacle 214). This ensures that, when inserted into the upper receptacle 214 of the component housing 222, the female socket interface 232 will "find" and mate with the male terminal 210 of the busbar 202. Further, in exemplary embodiments, there is very limited space between the female socket interface 232 and the inner surface 218 of the component housing 222, limiting the ingress of dust or particulates in the upper receptacle 214.

The wire crimp area 234 and seal crimp area 236 of the female terminal 226 occupy the lower receptacle 216 of the component housing 222. As the name suggests, the seal crimp area 236 attaches the parts that make up the upper part of the female terminal (female socket interface 232 and wire crimp area 234) to the rubber seal 230. The inner surface 220 of the lower receptacle 216 is more spacious (occupies a larger volume) than the inner surface 218 of the upper receptacle 214, as illustrated in FIGS. 2A and 2C. Further, in exemplary embodiments, the inner surface 218 of the upper receptacle 214 is rectangular cube-shaped while the inner surface 220 of the lower receptacle 216 is cylindrical in shape. In another embodiment, the lower receptacle 216 is conical in shape. The inner surface 220 of the lower receptacle 216 is sized to receive the rubber seal 230 of the female terminal 226. In an exemplary embodiment, the inner surface 220 of the lower receptacle 216 is sized such that, once the female terminal 226 is engaged with the male terminal 210, the rubber seal 230 forms a tight connection or seal. Further, in exemplary embodiments, the tight connection formed between the rubber seal 230 and the inner surface 220 prevents ingress of water and contaminants into the housing 222 of the electrical box 204. In exemplary embodiments, the tight connection between the rubber seal 230 and the inner surface 220 satisfies IP67 (total protection from dust and protected from temporary liquid immersion) and IP69K (proven to resist ingress of high temperature and pressure wash) Ingress Protection ratings.

As illustrated in FIGS. 2C-2E, the electrical box 204 may further include a busbar cover 238. The busbar cover 238 is placed over the busbar 202, such that the busbar base 212 is not visible, but the male terminal 210 is visible. The busbar cover 238 isolates the upper portion of the tines 224, which is the part of the tines to make connection to electrical components that are inserted into the electrical box 204. Further, the busbar cover 238 ensures that the u-shaped extension 206 is not able to accidentally connect to one of the inserted components. The metal terminal 210 is thus on the "outside" of the busbar cover 238 while the upper portion of the tines 224 are on the "inside" of the busbar cover.

Figure 3A:
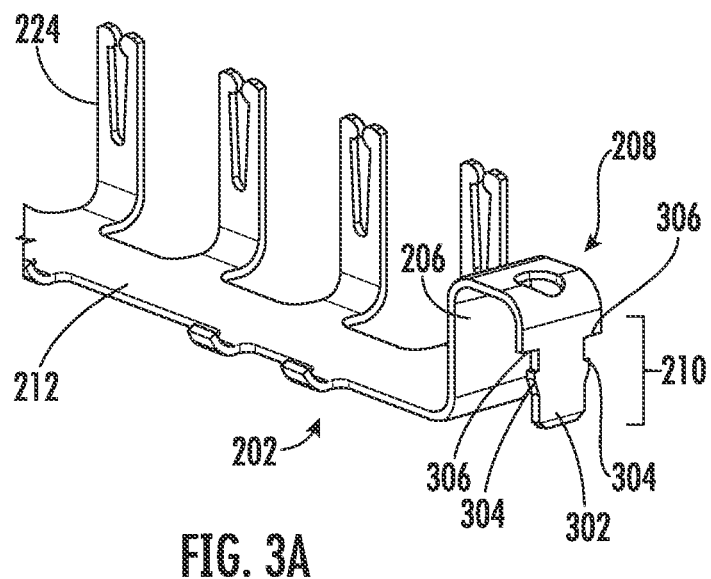
FIGS. 3A-3B are illustrations of the novel busbar design of FIGS. 2A-2F, in accordance with exemplary embodiments.
Figure 3B:
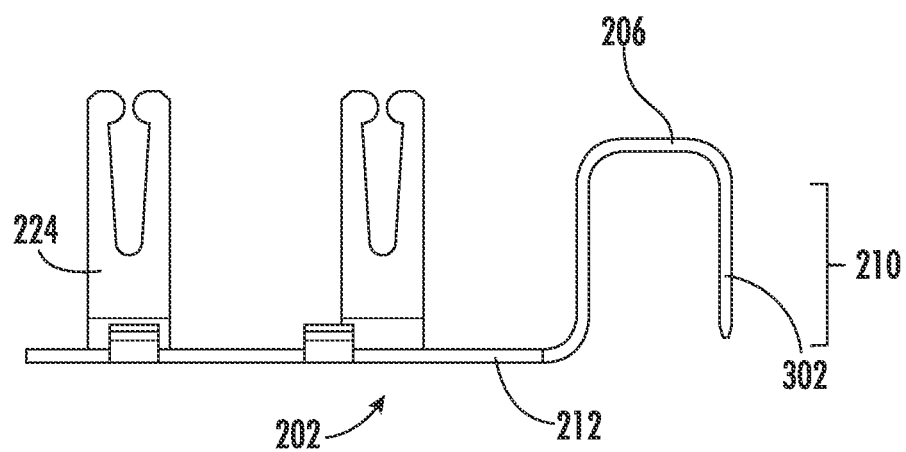

FIGS. 3A and 3B are representative illustrations of the busbar 202, in accordance with exemplary embodiments. FIG. 3A is a perspective view while FIG. 3B is a side view of the busbar 202. The busbar base 212, tines 224, u-shaped extension 206, and male terminal 210 are shown as before. The aperture 208 is partially shown in FIG. 3A. The male terminal 210 additionally includes a tooth 302, which is the part that is inserted into the female socket interface 232 of the female terminal 226, two barbs 304, and two female socket interface stoppers 306. In FIG. 3A, the tooth 302, the barbs 304, and the female socket interface stoppers 306 are shown. Another view of the male terminal 210 is illustrated in FIG. 4B, below.

With reference also to FIGS. 2B, 2D, and 2E, in an exemplary embodiment, when the female socket interface 232 is inserted into the male terminal 210, it is the tooth 302 that establishes a connection to an electrically conductive piece inside the female terminal 226 (not shown). At the top of the tooth 302, the barbs 304 provide retention with the upper receptacle opening 240. Finally, the female socket interface stoppers 306 keep the female socket interface 232 from being pushed too far into the tooth 302.

Figure 4D:
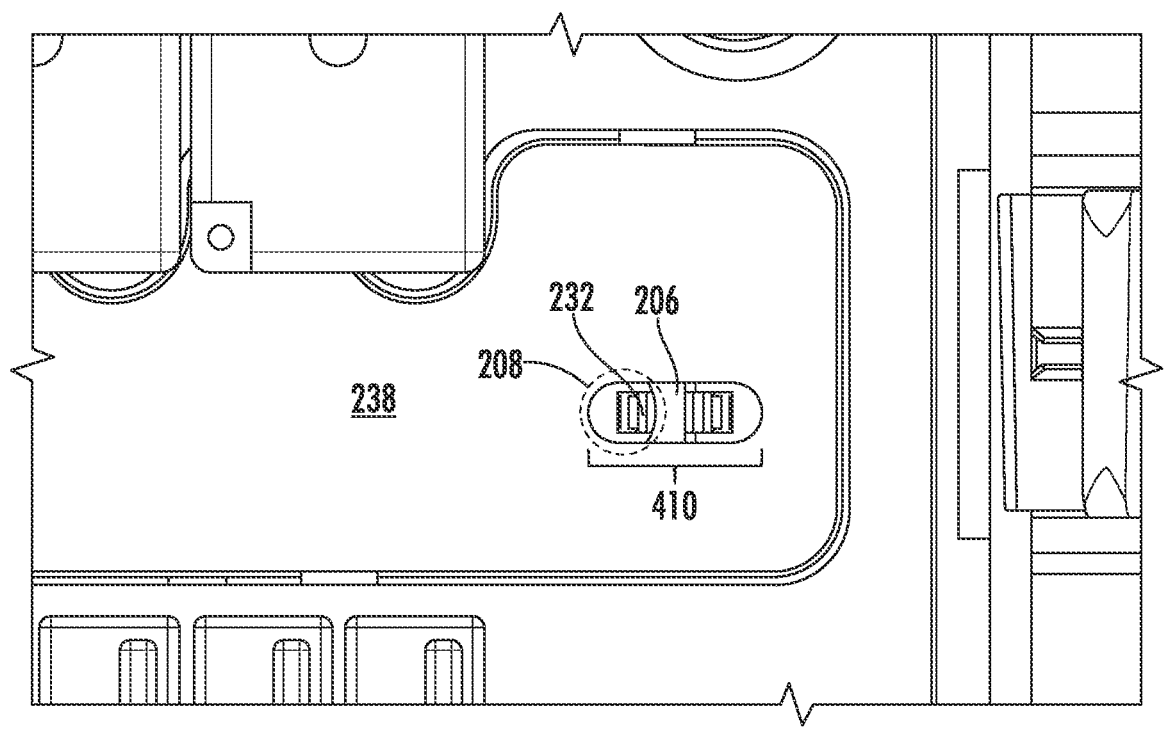

FIGS. 4A-4D are representative illustrations of an electrical box 400, in accordance with exemplary embodiments. FIG. 4A is an exploded perspective view of the electrical box 400; FIG. 4B is a perspective view of the electrical box 400 with no female terminal; FIG. 4C is a perspective view of the electrical box 400 with a female terminal; and FIG. 4D is a birds-eye view of the disengagement mechanism of the electrical box 400. The electrical box 400 provides a more complete view than the part of the electrical box 204 shown in FIGS. 2A-2E, above. The electrical box 400 is a type of secondary PDM or mini-PDM, designed to hold plug-in circuit protection components. The electrical box 400 is designed to be water-proof and, in exemplary embodiments, has Ingress Protection ratings of IP67 and IP69K.

The electrical box 400 features the busbar 202 and busbar cover 238 introduced in FIGS. 2A-2E, above. The busbar 402 fits into a busbar receptacle 412 of the component housing 222 such that the male terminal 210 is visible even after the busbar cover 238 is seated over the busbar, as in FIGS. 4B and 4C. The upper portion 214 of the housing 222 includes the upper receptacle opening 240 for receiving the male terminal 210 of the busbar 202.

The tines 224 of the busbar 202 are positioned in the busbar receptacle 412 so as to be connectable to the components of the electrical box 400. In this way, the busbar 202 supplies power to the components within the electrical box 400. An electrical box cover 402 fits over the component housing 222 to seal the components in place in the housing. A gasket 404 beneath the electrical box cover 402 is disposed over an edge of the component housing 222 before sealing.

Two power-sealing latches 408a-b (collectively, "latches 408") open easily to remove the electrical box cover 402 for component insertion and replacement. The latches 408 combine with the gasket 404 to keep the cover 402 sealed securely against the component housing 222, preventing water and dirt intrusion. The latches 408 are designed to snap in place audibly. An optional tether 406 keeps the cover 402 tied to the component housing 222, ensuring that the cover 402 is at hand once maintenance is complete.

At one end of the busbar cover 238, disposed over the aperture 208 of the busbar 202 is a disconnect aperture 410. As illustrated in more detail in FIG. 4D, the disconnect aperture 410, along with the aperture 208 of the u-shaped extension 206, provide access for disengaging the female terminal 226 from the electrical box 400, such as during maintenance or replacement of the electrical box 400. In the birds-eye view of FIG. 4D, the disconnect aperture 410 is an elongated circle (or a rounded rectangle), with only a portion of the aperture 208 being visible (the aperture is shown with a dotted line). Through the "window" of the disconnect aperture 410, a small portion of the u-shaped extension 206 of the busbar 202 is visible. Similarly, a small portion of the female socket interface 232 of the female terminal 226 is visible in the disconnect aperture 410. By inserting a small tool, such as a knife or flat-head screwdriver, into the aperture 208, it is possible to disconnect the female terminal 226 from the electrical box 400. When the electrical box cover is sealed on the component housing 222 (using the power sealing latches 408), the disconnect aperture 410 is not accessible and the female terminal 226 is not removable from the electrical box 400.

Thus, a novel busbar design is disclosed for electrical boxes such as power distribution modules. Particularly where the power distribution modules house low-power devices, the busbar design is more cost effective and cheaper to manufacture than legacy busbar designs. Further, the electrical box housing the busbar design features Ingress Protection ratings of IP67 (total protection from dust and protected from temporary liquid immersion) and IP69K (proven to resist ingress of high temperature and pressure wash), in exemplary embodiments.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

While the present disclosure makes reference to certain embodiments, numerous modifications, alterations and changes to the described embodiments are possible without departing from the sphere and scope of the present disclosure, as defined in the appended claim(s). Accordingly, it is intended that the present disclosure not be limited to the described embodiments, but that it has the full scope defined by the language of the following claims, and equivalents thereof.

The invention claimed is:

1. An electrical box comprising:
 a housing to receive a plurality of components, the housing comprising a lower receptacle comprising an inner surface; and
 a busbar disposed within the housing, the busbar to supply electrical power to the plurality of components, the busbar further comprising:
  a base to be seated within the housing;
  a plurality of tines to be connected to one or more of the plurality of components; and
  a u-shaped extension comprising a male terminal at one end, the male terminal to be coupled with a female terminal comprising a rubber seal;
 wherein the inner surface of the lower receptacle is shaped so that, once the female terminal is coupled with the male terminal, a fluid tight connection is formed between the inner surface and the female terminal.

2. The electrical box of claim 1, the housing further comprising a busbar receptacle, wherein the busbar is disposed within the busbar receptacle.

3. The electrical box of claim 1, the housing further comprising an upper receptacle comprising a second inner surface, the upper receptacle to receive a female socket interface of the female terminal.

4. The electrical box of claim 3, wherein the inner surface of the lower receptacle is cylindrical in shape.

5. The electrical box of claim 4, wherein the second inner surface of the upper receptacle is rectangular cube-shaped.

6. The electrical box of claim 3, wherein the inner surface of the lower receptacle is conical in shape.

7. The electrical box of claim 6, the lower receptacle having a first volume and the upper receptacle having a second volume, wherein the first volume is greater than the second volume.

8. The electrical box of claim 5, wherein the female terminal, once inserted into the second inner surface of the upper receptacle, is bidirectionally movable along one axis and not movable along a second axis, the second axis being orthogonal to the one axis.

9. The electrical box of claim 8, wherein the female terminal, once inserted into the second inner surface of the upper receptacle, is not moveable in a direction rotational to the one axis.

10. The electrical box of claim 1, the u-shaped extension of the busbar further comprising an aperture to receive a tool, the tool to release the female terminal from being coupled with the male terminal.

11. The electrical box of claim 10, further comprising a busbar cover, the busbar cover comprising a second aperture, wherein the second aperture is disposed over the aperture, the second aperture to receive the tool.

12. A busbar comprising:
 a busbar base disposed along a first axis;
 a plurality of tines disposed along a second axis, the plurality of tines to connect to one or more components of an electrical box;
 a u-shaped extension to the busbar base, wherein a male terminal is disposed at an end of the u-shaped extension, the male terminal to be mated with a female terminal; and
 an aperture disposed on a top portion of the u-shaped extension.

13. The busbar of claim 12, wherein the second axis is perpendicular to the first axis.

14. The busbar of claim 13, wherein the male terminal is disposed along a third axis.

15. The busbar of claim 14, wherein the third axis is perpendicular to both the first axis and the second axis.

16. The busbar of claim 12, the aperture to receive a tool to enable removal of the female terminal once coupled to the male terminal.

17. A housing for use in an electrical box, the housing comprising:
- a busbar receptacle to receive a busbar, the busbar to provide power to components connected to the housing;
- an upper receptacle shaped to receive a female socket interface of a female terminal, the upper receptacle comprising an opening shaped to receive a male terminal of the busbar;
- a lower receptacle comprising an inner surface shaped to receive a rubber seal of the female terminal;
- a busbar cover to be placed over the busbar, wherein a u-shaped extension of the male terminal of the busbar is visible once the busbar cover is in place; and
- a disconnect aperture, wherein the disconnect aperture is disposed over the u-shaped extension of the busbar.

18. The housing of claim 17, wherein the disconnect aperture receives a tool to disconnect the male terminal from the female terminal.

* * * * *